3,050,914
Patented Aug. 28, 1962

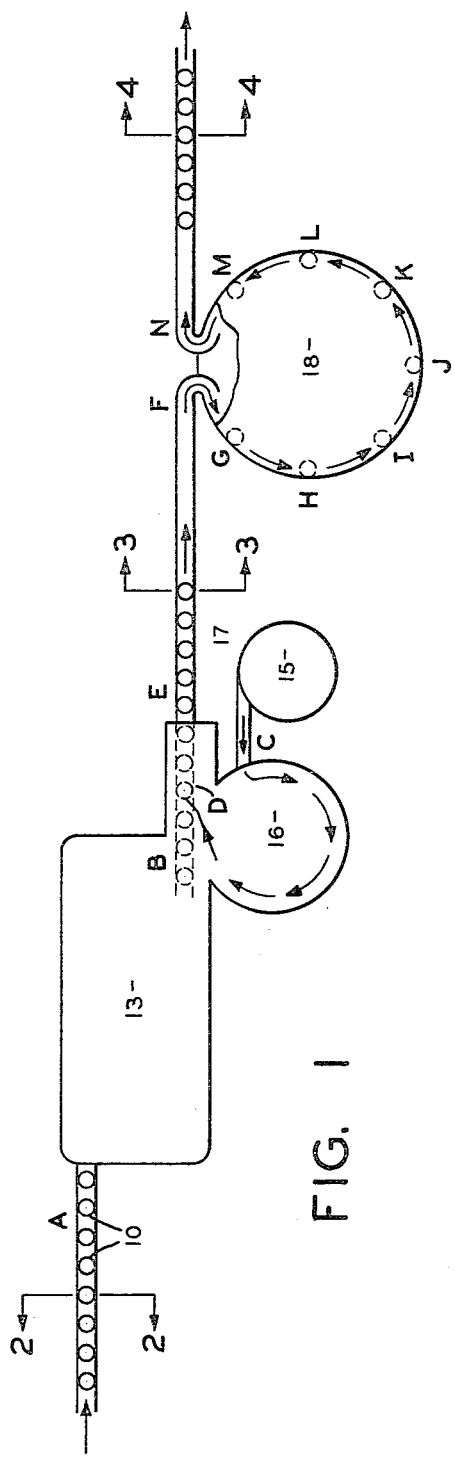

3,050,914
STERILIZING PROCEDURES FOR ASEPTIC CANNING
Harry A. Morgan, Jr., Palos Verdes Estates, Calif., assignor to Reddi-Wip, Inc., Los Angeles, Calif., a corporation of Missouri
Filed May 25, 1959, Ser. No. 815,673
6 Claims. (Cl. 53—25)

This invention relates to improvements in methods of aseptic canning, and has particular reference to preparation of cans and can-closing elements for aseptic canning by a novel procedure for the sterilization thereof, and to the use of such cans and closures during the complex procedures of aseptic canning.

In prior methods of aseptic canning, two entirely separate types of procedures have been attempted. One involves pre-sterilizing cans and can-closing elements and conveying them through shrouded passages in a steam atmosphere, to the equipment wherein the can is filled and a can-pressurizing gas added within the can headspace. In such apparatus, the shrouds make the apparatus cumbersome to construct and difficult to operate and maintain, for once sterilized operation has been commenced, the cans and closing elements are inaccessible. Such units have not proved to be suited for ordinary commercial manufacturing.

The other type of apparatus suggested by prior art involves sterilizing the can and can-closing elements therefor in the filler equipment itself. It is doubtful whether any such apparatus has ever been satisfactory in practical use. Particularly in the region of their seams, where the increased mass of metal is hard to heat and a sterilizing fluid or gas cannot readily flow, the time required for sterilization is increased. Such portions may be thought of as requiring a "deeper" sterilization than smooth, exposed surfaces. The same would be true of complex can-closing elements such as closures which include hard-to-sterilize members such as valves and elastic seals. It is not possible to coordinate the long periods of time required for sterilizing such seams or members with the high productivity required of filler equipment. Besides, long-continued sterilization is likely to leave the cans too warm to be filled immediately, further lessening the productivity of the filler equipment. Also, products containing fat have been found to splatter when filled into excessively hot containers. The splattering fat may damage the protective coating on the inner surface of the container, with consequent danger of impairing the product itself.

The objects of the present invention are to overcome the shortcomings of both of the methods described, and to permit the necessary time for sterilization of such elements or can areas which are hard to reach or slow to heat, and to avoid prolonged time cycles of filler equipment, still without the complexity of shrouded conveyor apparatus. Further objects are to permit thoroughly-sterilized containers to cool sufficiently that they may be filled safely, and yet provide that high degree of sterilization and asepsis which is required for aseptic canning. A further purpose is to provide a method of aseptic canning in cans whose temperature is well below the temperature to which they have been heated for purpose of sterilization. Additional purposes will be apparent from this specification.

I attain these objects by a unique process wherein the sterilization requirements of the cans and cover components are subjected to separate pre-sterilization operations adequate for asepsis, after which they are preliminarily assembled so as to cover the cans, then cooled while being conveyed through a room-temperature atmosphere to an aseptic filler. In it the cover components are removed, and each part is subjected to a sterilizing fluid, preferably saturated steam, and restored to sterility. The saturated steam is drawn off by vacuum, a sterile container-pressurizing gas is introduced, and the can is then filled, the closure replaced and sealed and the container is ejected. The sequence of operations is explained in connection with the accompanying drawings, in which:

FIGURE 1 is a schematic flow diagram.
FIGURES 2, 3 and 4 are fragmentary cross-sections showing respecitvely an empty open container before first sterilizing, such a container covered with a closure after first sterilization, and a filled sealed container.

Empty cans 10 which may have double seams 11 and a top opening or mouth 12, are conveyed at stage A into a container sterilizer 13, shown schematically, and are there thoroughly sterilized in any convenient manner, using either saturated or super-heated steam for a sufficient period of time and at sufficiently high temperature to assure sterility of those portions which are hardest to sterilize. These portions will ordinarily be the thicker regions of the containers which are more slowly heated, such as the double-seams 11 and the areas adjacent them. After such thorough, or "deep" sterilization, the containers 10 may be too hot to fill. I preserve this sterility to and undetermined but nevertheless substantial extent by covering their mouths 12 with the same closures which will ultimately seal them.

Closures 14 enter from a closure feeder designated 15 and shown schematically, into a closure sterilizer 16, the step being indicated as C with the sterilization of the containers. The closures 14 are subjected to sterilization for a suitable period of time, depending on their structure and the presence of complicating elements such as a valve for pressurized dispensing. The closure sterilizer 16 is connected physically or at least by sterile atmosphere, to the container sterilizer 13, at B. Sterilized closures 14 are fed into position, one onto the mouth 12 of each container, within such sterile atmosphere in the stage designated D, so as to fit thereon as shown in FIGURE 3. The containers 10 with closures 14 leave the sterilized atmosphere at step E on a suitable conveyor 17 and are permitted to cool to a temperature suitable for filling the particular product. They are exposed at this stage to non-sterile atmosphere. Yet they are fairly effectively covered and parts which require "deep" sterilization (such as the insiders of the can seams 11) are slowest to cool and least subject to contamination from the atmosphere. Inasmuch as the time for cooling of the cans as a whole is not great, sterility may be restored by what might otherwise be a superficial sterilization operation.

The cooled cans and closures are conveyed to an aseptic filler apparatus designated 18 of the type which performs operations cyclically in sequence, one sequence per cycle.

The respective stages of the operation are schematically represented by angular portions around the periphery of such a filler 18. Because rotary filling equipment is familiarly used, I have chosen this type for representing the operations here involved. However it is understood that it is the sequence of operations which is the subject of the invention, not any particular type of equipment therefor.

The following sequence of operations takes place during a single cycle of the filler apparatus 18:

At F, the container 10 with its closure 14 in place on its mouth 12 enters a chamber of the filler apparatus 18, and is sealedly enclosed therein (alternatively, seal may be made about the container wall so that the mouth 12 is enclosed within the chamber). As the sequence progresses to stage G, the closure 14 is lifted off the mouth 12 of the container 10. From G to H, air is evacuated from the chamber by exposure to a vacuum of say 28 to 29 inches of mercury. From H to I, sterilizing fluid, preferably saturated steam is introduced into the evacuated chamber at a temperature of say 300° under pressure, enveloping the surfaces of the containers 10 and covers 14, and restoring sterility to them, as well as to the chamber itself. This step may be very fast, say approximately one second. From I to J, the container is again evacuated by exposure to a vacuum, the saturated steam evaporates quickly ("flashes off") in the vacuum, leaving the container dry and somewhat cooled by the evaporation. From J to K, the sterilized chamber is filled with a sterilized gas which is either inert or chemically compatible with the particular product. The gas is used at the pressure to be maintained in the head-space of the container after filling. From stage K to stage L, pre-sterilized product is introduced into the container and the container filled to the desired level. Between L and M the closure 14 is replaced on the mouth 12 of the container 10. From M to N the closure 14 is sealed onto the container 10 as by crimping as shown in FIGURE 4. After N the container so sealed is discharged from the filler apparatus 18.

Referring back to the first evacuation stage, from G to H the removal of air from the processing chamber and from the container itself exposes the container surface areas and the closure surface areas to quick and complete envelopment by the saturated steam which is thereafter forced into the processing chamber. The use of saturated steam quickens the rate of heat transfer. The approximate one-second exposure mentioned has been found to be adequate for restoring complete sterility, considering the thorough preliminary sterilization and the fact that exposure during the brief cooling period between the stages E and F does not permit any deep-seated contamination to occur.

Variations of the methods and sequence of operations herein described will occur to those familiar with the art. The following claims hereof are not therefore to be construed narrowly, but instead as fully co-extensive with their scope which is as follows.

I claim:

1. A method of preparing a can and can cover for aseptic canning within a processing chamber, comprising the steps of heat sterilizing an open can and a can cover in a sterile atmosphere, then without removing from the sterile atmosphere, placing such sterilized cover upon such sterilized can whereby to cover its opening, but not to seal same then conveying the can with cover thereon out of the sterile atmosphere and permitting them to cool to but not below a temperature suitable for aspetic canning, then introducing the can with cover thereon into a processing chamber and removing the cover from the can, then introducing a sterilizing fluid into said chamber whereby to restore the surfaces of the can and cover to sterility, then evacuating the sterilizing fluid by sub-atmospheric pressure.

2. A method of preparing a seamed can and a can cover for aseptic canning, comprising the steps of heat sterilizing an open can in a sterile atmosphere for such time and at such temperature that even its seams are thoroughly sterilized, independently sterilizing a cover for the can, then without removing either from sterile atmosphere, covering but not sealing the opening of the sterilized can with the sterilized cover, then conveying the can and cover thereon out of the sterile atmosphere and permitting them to cool only to a temperature suitable for aseptic canning, then introducing said can with cover thereon into a filling chamber, closing the chamber from contamination, and removing the cover within such chamber, then evacuating the air from the chamber, then introducing saturated steam under pressure into the chamber whereby to restore sterility to the surfaces of the can and cover, and then evacuating the steam under sub-atmospheric pressure, whereby its moisture is evaporated and the can is left cool enough for immediate filling.

3. The method of aseptic canning which comprises the preliminary step of bulk-sterilizing a product to be canned, together with the method of preparing a can and can cover as set forth in claim 2, then introducing sterilized product into the can, then replacing the cover on the can opening, then sealing it in place, and then removing the can from the chamber.

4. The method of aseptic canning along with a package-pressurizing gas which comprises the preliminary step of bulk-sterilizing a product to be canned, together with the method of preparing a can and can cover as set forth in claim 2, then inserting a package-pressurizing gas, then introducing sterilized product into the can, then replacing the cover on the can opening, then sealing it in place, and then removing the can from the chamber.

5. A method of sterilizing containers and container-covering elements and canning therein, comprising the steps of heat sterilizing the inner surface of an open container and a container-covering element and, while they are hot and sterile, covering but not sealing the container opening with the covering element, then conveying the cotainer so covered in an unsterile, cooling atmosphere for a time sufficient to permit their temperature to drop to a suitable canning temperature but not therebelow, then introducing a portion of the container including its covered mouth within a chamber, then closing the chamber, then removing the covering element, then restoring sterility to the container portion and covering element exposed to the inside of the chamber, then filling the container with its intended contents, then reapplying the covering element and sealing it onto the container, and then removing from the chamber.

6. A method for aseptically canning a product under the pressure of a pressurizing gas in the can head-space, comprising the steps of heat sterilizing an open can and a can cover in a sterile atmosphere, independently sterilizing a cover for the can, then without removing either from sterile atmopshere, covering the opening of the sterilized can with the sterilized cover but not sealing it thereon, then conveying the can and cover thereon out of the sterile atmosphere through an unsterile cooling atmosphere and thereby cooling to a temperature suitable for canning, then introducing said can with cover thereon into an aseptic filling chamber, closing the chamber from contamination, and removing the cover therefrom within such chamber, then evacuating the air from the chamber, then introducing into said chamber a sterilizing fluid whereby to restore sterility to the surfaces of the can and cover, then evacuating the sterilizing fluid, then introducing into the chamber a sterile can-pressurizing gas and maintaining it at the pressure at which the can head-space is to be pressurized, then introducing the product into the can, then replacing the cover on the can opening and sealing it in place, and then removing the can from the chamber.

References Cited in the file of this patent

UNITED STATES PATENTS

| | | |
|---|---|---|
| 2,355,073 | Hothersall | Aug. 8, 1944 |
| 2,514,027 | Clifcorn et al. | July 4, 1950 |
| 2,561,404 | Nordquist | July 24, 1951 |
| 2,761,603 | Fairchild | Sept. 4, 1956 |
| 2,855,314 | Martin | Oct. 7, 1958 |
| 2,885,845 | Ryan | May 12, 1959 |